US012726761B2

(12) United States Patent
Fukui et al.

(10) Patent No.: US 12,726,761 B2
(45) Date of Patent: Sep. 1, 2026

(54) SOUND SYSTEM

(71) Applicant: NTT, Inc., Tokyo (JP)

(72) Inventors: Masahiro Fukui, Tokyo (JP); Kazunori Kobayashi, Tokyo (JP); Noriyoshi Kamado, Tokyo (JP); Ryotaro Sato, Tokyo (JP)

(73) Assignee: NTT, Inc., Tokyo (JP)

( * ) Notice: Subject to any disclaimer, the term of this patent is extended or adjusted under 35 U.S.C. 154(b) by 205 days.

(21) Appl. No.: 18/277,948

(22) PCT Filed: Feb. 24, 2021

(86) PCT No.: PCT/JP2021/006872
§ 371 (c)(1),
(2) Date: Aug. 18, 2023

(87) PCT Pub. No.: WO2022/180687
PCT Pub. Date: Sep. 1, 2022

(65) Prior Publication Data

US 2024/0129664 A1 Apr. 18, 2024

(51) Int. Cl.
*H04R 1/40* (2006.01)
*H04R 5/02* (2006.01)

(52) U.S. Cl.
CPC ............. *H04R 1/403* (2013.01); *H04R 5/023* (2013.01); *H04R 2499/13* (2013.01)

(58) Field of Classification Search
CPC ..... H04R 1/403; H04R 5/023; H04R 2499/13
See application file for complete search history.

(56) References Cited

U.S. PATENT DOCUMENTS 8,457,324 B2 * 6/2013 Tice ........................ H04R 1/323 381/71.7
8,891,782 B2 * 11/2014 Kim ......................... H04R 3/12 381/71.7

(Continued)

FOREIGN PATENT DOCUMENTS

JP 2006345477 A 12/2006
JP 2019522947 A 8/2019

OTHER PUBLICATIONS

In-flight entertainment/Japan Airline first class, [online], [Searched on Feb. 1, 2021], Internet <URL: https://www.ial.co.jp/jp/ja/inter/service/first/entertainment/index.html> with its English version.

(Continued)

*Primary Examiner* — Disler Paul

(57) ABSTRACT

Provided is an acoustic system for a user who uses a seat of an aircraft, an automobile, or the like, which reproduces a sound that cannot be heard by surrounding users without using earphones or headphones. An acoustic system including a speaker system that includes at least one speaker unit pair including a positive speaker unit that emits a sound based on an acoustic signal of a predetermined sound source and a negative speaker unit that emits a sound based on an acoustic signal having an opposite phase to the acoustic signal, in which the speaker unit pair is configured such that a surface of the positive speaker unit and a surface of the negative speaker unit located foremost when viewed from a front direction are one plane perpendicular to a ground plane, and an arrangement of the positive speaker unit and the negative speaker unit when viewed from the front direction is parallel to a direction perpendicular to the ground plane, and is configured such that sounds emitted from the positive speaker unit and the negative speaker unit in a rear direction go around in the front direction.

13 Claims, 20 Drawing Sheets

(56) References Cited

U.S. PATENT DOCUMENTS

| | | | | |
|---|---|---|---|---|
| 9,949,030 | B2 | 4/2018 | Sun et al. | |
| 11,503,407 | B2 * | 11/2022 | Corynen | H04R 3/12 |
| 2006/0269068 | A1 | 11/2006 | Yokota | |

OTHER PUBLICATIONS

Articles presented on "NTT R&D Forum 2020 Connect"; A-15, Nov. 16, 2020, Internet <URL: https://www.rd.ntt/forum/> 1. Explanatory panel: Media Processing Device Technology in the Remote World Era; Deliver only the sounds you want to hear_ with its English translation; 2. Figures; and 3. Online article: Media processing technology for personalized sound zone; Delivering only sounds you want to make known/heard_ with its English translation generated by computer.

* cited by examiner

SOUND SYSTEM

CROSS-REFERENCE TO RELATED APPLICATIONS

This application is a U.S. 371 Application of International Patent Application No. PCT/JP2021/006872, filed on 24 Feb. 2021, the disclosure of which is hereby incorporated herein by reference in its entirety.

TECHNICAL FIELD

The present invention relates to a sound reproduction technology that can be used in an audio system installed in a seat of an aircraft, an automobile, or the like.

BACKGROUND ART

Conventionally, a user uses earphones or headphones to view and listen to movies or music in an aircraft (see Non Patent Literature 1). This is because when a speaker is used, the reproduced sound reaches the periphery of the user, which causes trouble to other users.

CITATION LIST

Non Patent Literature

Non Patent Literature 1: In-flight entertainment/Japan Airline first class, [online], [Searched on Feb. 1, 2021], Internet URL:https://www.jal.co.jp/jp/ja/inter/service/first/entertainment/index.html>

SUMMARY OF INVENTION

Technical Problem

However, wearing earphones or headphones is troublesome for the user. In addition, there are users who do not like wearing due to, for example, disheveling of hair. Some users do not like pressure on their ears due to wearing. Furthermore, wearing earphones or headphones for a long time may make the user feel tired of listening.

In order to eliminate the need to wear earphones or headphones, it is conceivable to synthesize a virtual sound field using a wavefront synthesis technology, but in this case, it is necessary to prepare a large-scale speaker array, which is not realistic.

Therefore, an object of the present invention is to provide an acoustic system for a user, by way of example, who uses a seat of an airplane or an automobile, which reproduces a sound that cannot be heard by surrounding users without using earphones or headphones.

Solution to Problem

An aspect of the present invention is an acoustic system including a speaker system that includes at least one speaker unit pair including a speaker unit (hereinafter, referred to as a positive speaker unit) that emits a sound based on an acoustic signal of a predetermined sound source and a speaker unit (hereinafter, referred to as a negative speaker unit) that emits a sound based on an acoustic signal having an opposite phase to the acoustic signal, in which the speaker unit pair is configured such that a surface of the positive speaker unit and a surface of the negative speaker unit of the speaker unit pair located foremost when viewed from a front direction of the speaker unit pair are one plane perpendicular to a ground plane of the speaker unit pair, and an arrangement of the positive speaker unit and the negative speaker unit of the speaker unit pair when viewed from the front direction of the speaker unit pair is parallel to a direction perpendicular to the ground plane of the speaker unit pair, and the speaker unit pair is configured such that a sound emitted from the positive speaker unit in the rear direction and a sound emitted from the negative speaker unit in the rear direction go around in the front direction.

An aspect of the present invention is an acoustic system including a speaker system that includes at least one speaker unit pair including a speaker unit (hereinafter, referred to as a positive speaker unit) that emits a sound based on an acoustic signal of a predetermined sound source and a speaker unit (hereinafter, referred to as a negative speaker unit) that emits a sound based on an acoustic signal having an opposite phase to the acoustic signal, in which the speaker unit pair is configured such that a surface of the positive speaker unit and a surface of the negative speaker unit of the speaker unit pair located foremost when viewed from a front direction of the speaker unit pair are one plane perpendicular to a ground plane of the speaker unit pair, and an arrangement of the positive speaker unit and the negative speaker unit of the speaker unit pair when viewed from the front direction of the speaker unit pair is parallel to a direction horizontal to the ground plane of the speaker unit pair, and the speaker unit pair is configured such that a sound emitted from the positive speaker unit in the rear direction and a sound emitted from the negative speaker unit in the rear direction go around in the front direction.

An aspect of the present invention is an acoustic system including a speaker system that includes at least one speaker unit pair including a speaker unit (hereinafter, referred to as a positive speaker unit) that emits a sound based on an acoustic signal of a predetermined sound source and a speaker unit (hereinafter, referred to as a negative speaker unit) that emits a sound based on an acoustic signal having an opposite phase to the acoustic signal, in which the speaker unit pair is configured such that a surface of the positive speaker unit and a surface of the negative speaker unit of the speaker unit pair located foremost when viewed from a front direction of the speaker unit pair are a plane forming a predetermined angle θ (where $0<\theta<\pi/2$) with a ground plane of the speaker unit pair, and an arrangement of the positive speaker unit and the negative speaker unit of the speaker unit pair when viewed from the front direction of the speaker unit pair is parallel to a direction horizontal to the ground plane of the speaker unit pair, and the speaker unit pair is configured such that a sound emitted from the positive speaker unit in the rear direction and a sound emitted from the negative speaker unit in the rear direction go around in the front direction.

An aspect of the present invention is an acoustic system including a speaker system that includes at least one speaker unit pair including a speaker unit (hereinafter, referred to as a positive speaker unit) that emits a sound based on an acoustic signal of a predetermined sound source and a speaker unit (hereinafter, referred to as a negative speaker unit) that emits a sound based on an acoustic signal having an opposite phase to the acoustic signal, in which the speaker unit pair is configured such that each of a surface of the positive speaker unit of the speaker unit pair located foremost when viewed from a front direction of the speaker unit pair and a surface of the negative speaker unit of the speaker unit pair located foremost when viewed from the front direction of the speaker unit pair is parallel to one plane forming a predetermined angle θ (where $0<\theta<\pi/2$) with a ground plane of the speaker unit pair, and the speaker unit pair is configured such that a sound emitted from the positive speaker unit in the rear direction and a sound emitted from the negative speaker unit in the rear direction go around in the front direction.

Advantageous Effects of Invention

According to the present invention, it is possible to reproduce a sound that can be heard only in a very limited narrow range.

DESCRIPTION OF EMBODIMENTS

Figure 1:
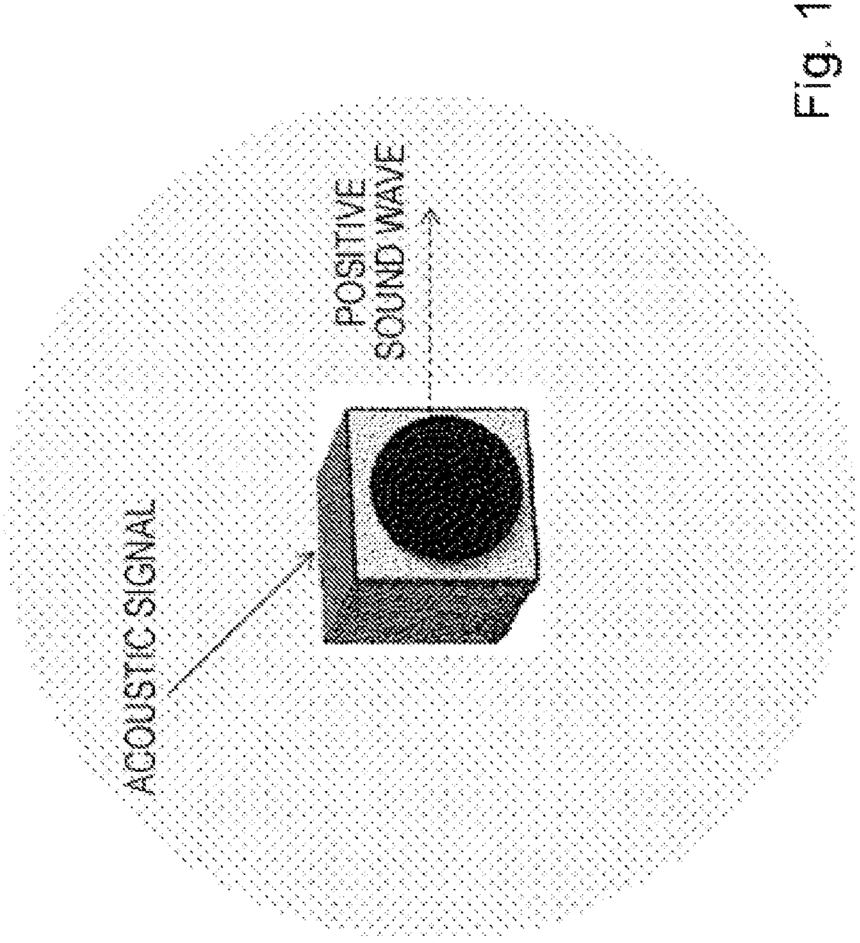
FIG. 1 is a diagram for explaining directivity of a sound emitted from a speaker.

Hereinafter, embodiments of the present invention will be described in detail. Note that components having the same functions are denoted by the same reference numerals, and redundant description will be omitted.

TECHNICAL BACKGROUND

First, the directivity of a sound emitted from a speaker will be described. Next, the directivity of a sound emitted from a speaker unit pair of the invention of the present application will be described. Finally, results of experiments for confirming the effects of the speaker unit pair of the invention of the present application will be described.

<<1: Directivity of Sound Emitted from Speaker>>

Typically, a speaker includes a speaker unit and a speaker box. The speaker unit is a component including a diaphragm that converts an acoustic signal, which is an electric signal, into vibration of air (that is, generates a sound wave). In addition, the speaker box is a component that houses the speaker unit.

When the acoustic signal is input to the speaker, the diaphragm of the speaker unit vibrates, and a sound wave is radiated in both directions in which the diaphragm vibrates. Here, a sound wave radiated to the outside of the speaker box (that is, the front direction of the speaker unit) is referred to as a positive sound wave, and a sound wave radiated to the inside of the speaker box (that is, the rear direction of the speaker unit) is referred to as a negative sound wave. The negative sound wave is a sound wave having a phase opposite to the phase of the positive sound wave. FIG. 1 is a diagram for explaining directivity of sound emitted from a speaker. As illustrated in FIG. 1, the positive sound wave is radiated from the speaker in all directions, while the negative sound wave does not exit the speaker box. As a result, the sound emitted from the speaker can be heard in a wide range.

<<2: Directivity of Sound Emitted from Speaker Unit Pair>>

Figure 2:
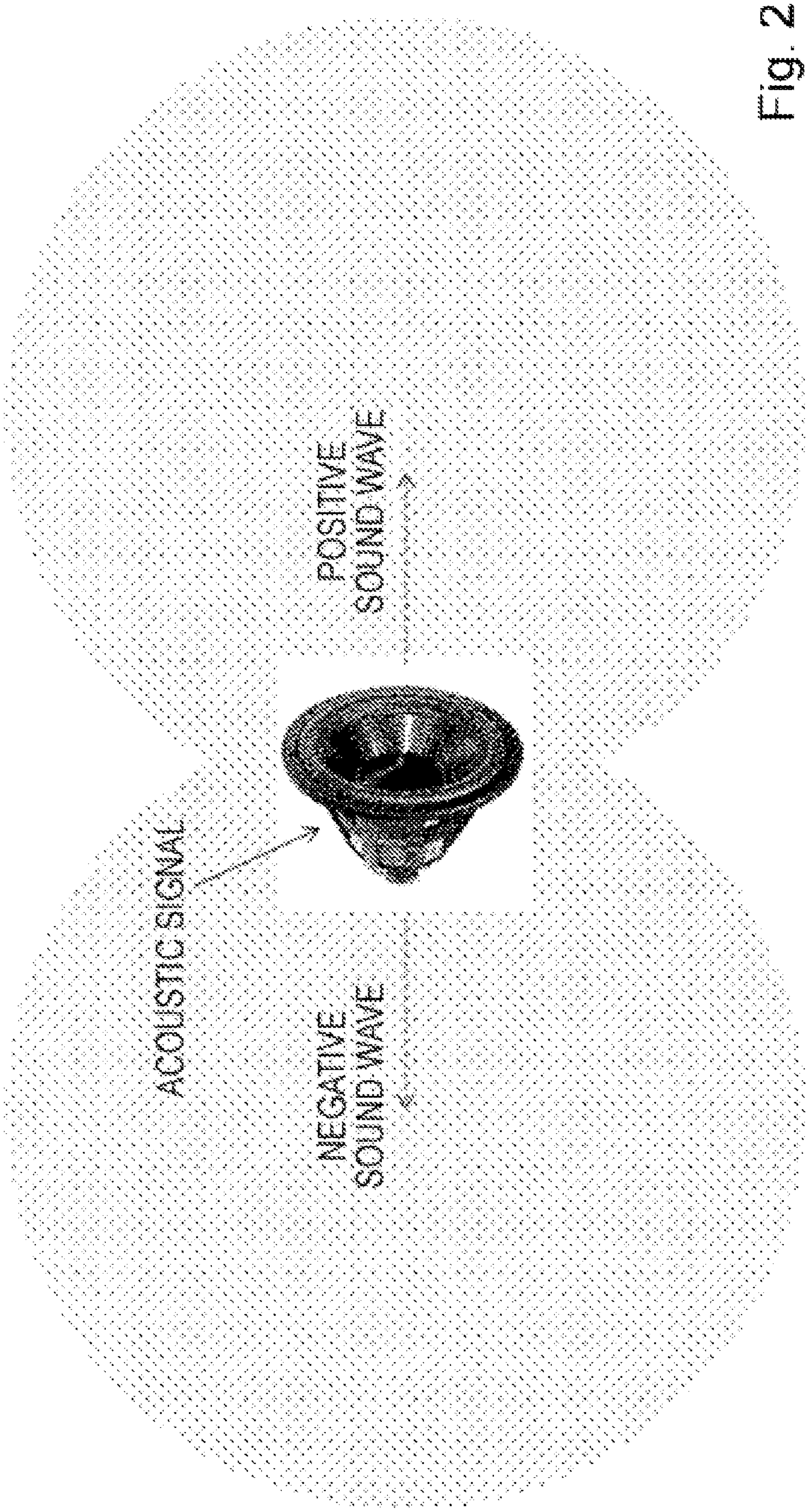
FIG. 2 is a diagram for explaining directivity of a sound emitted from a speaker unit.

Here, first, the directivity of a sound emitted from the speaker unit, which is a bare speaker, will be described. FIG. 2 is a diagram for explaining directivity of a sound emitted from a speaker unit. In the case of only the speaker unit, a negative sound wave is radiated from the back surface of the speaker unit hidden in the speaker box, unlike the case of the speaker. Therefore, as illustrated in FIG. 2, the sound emitted from the speaker unit has a characteristic of bidirectivity.

Figure 3:
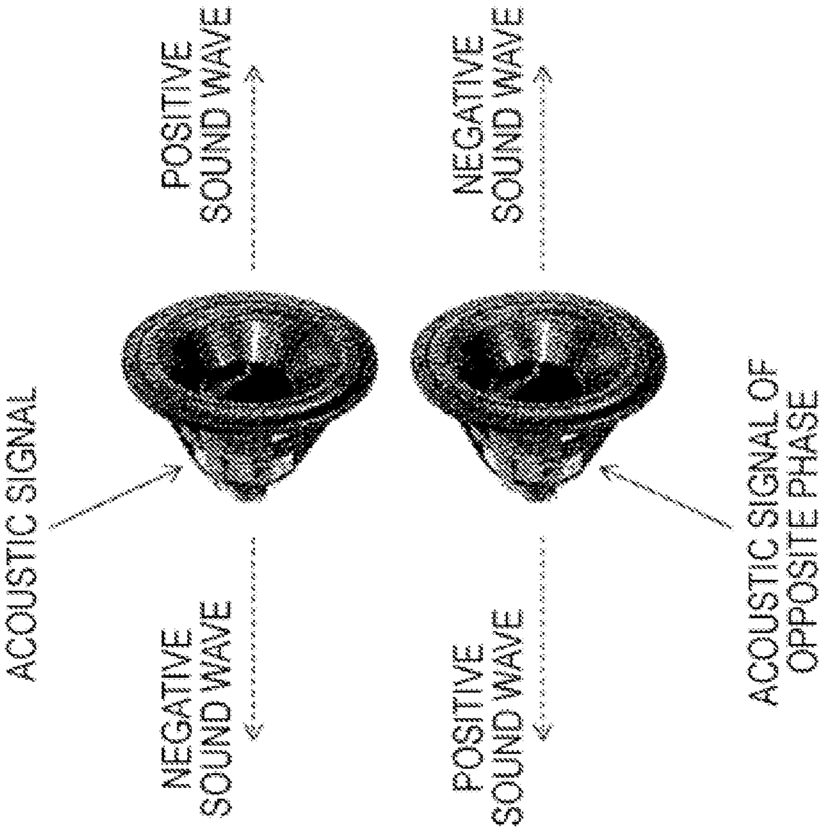
FIG. 3 is a diagram for explaining a sound emitted from a speaker unit pair.
Figure 4:
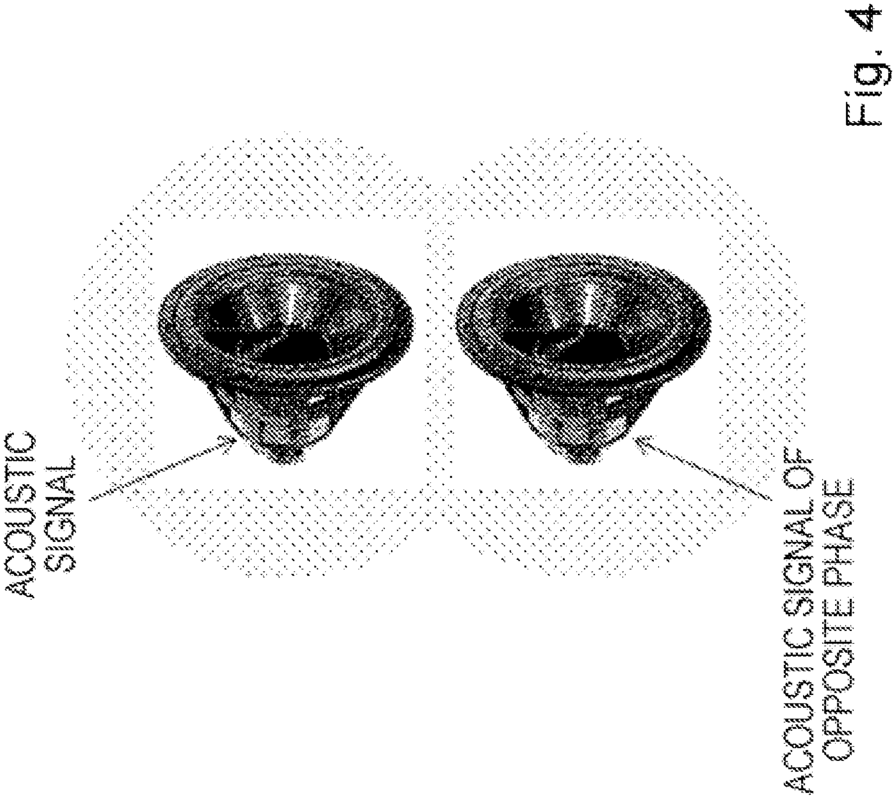
FIG. 4 is a diagram for explaining directivity of a sound emitted from a speaker unit pair.

In the invention of the present application, this bidirectivity is used. Hereinafter, a specific description will be given. First, as illustrated in FIG. 3, two speaker units are arranged to form a speaker unit pair. When two acoustic signals having an opposite positive and negative relationship are input to the speaker unit pair, the diaphragms of the two speaker units vibrate, and sounds based on the two acoustic signals are emitted. Then, as illustrated in FIG. 4, a sound in all directions except for the vicinity of the speaker unit pair is erased. In other words, the sound is erased only at a position sufficiently away from the speaker unit pair, and the sound is not erased in the vicinity of the speaker unit pair. The reason why the sound is not erased in the vicinity of the speaker unit pair is that the phases of the sound wave radiated from the front surface of the speaker unit and the sound wave going around from the back surface do not match in the vicinity of the speaker unit pair.

That is, by utilizing the property that a sound can be heard only in the vicinity of the speaker unit pair when a predetermined acoustic signal is input to one speaker unit constituting the speaker unit pair and an acoustic signal having a phase opposite to that of the predetermined acoustic signal is input to the other speaker unit, it is possible to create a situation in which only the user in the vicinity of the speaker unit pair can hear the sound and the other users can not hear the sound.

<<3: Experimental Results>>

Figure 5:
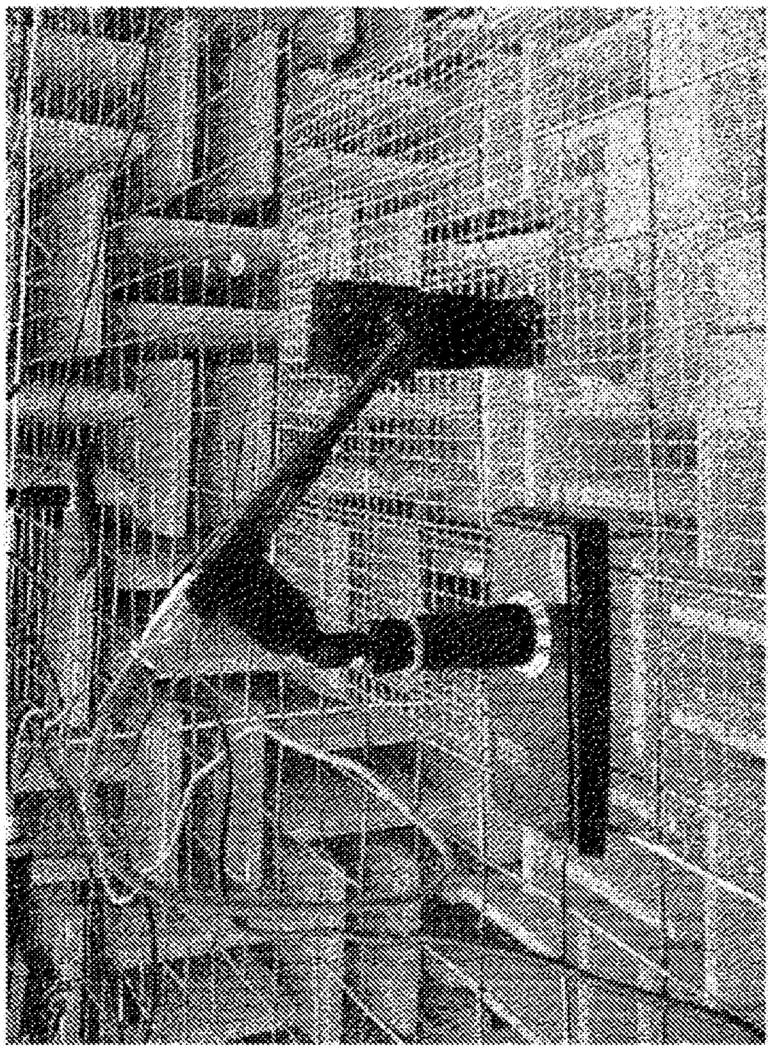
FIG. 5 is a diagram illustrating a state of an experiment (positional relationship between a speaker and a microphone).
Figure 6:
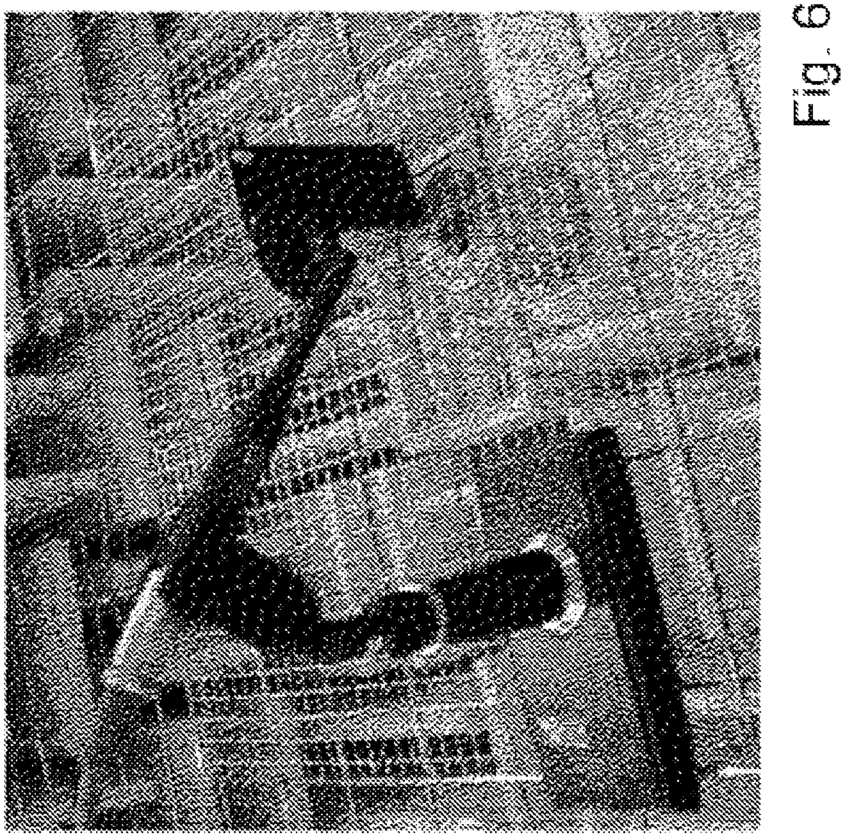
FIG. 6 is a diagram illustrating a state of an experiment (positional relationship between a speaker unit and a microphone).
Figure 7:
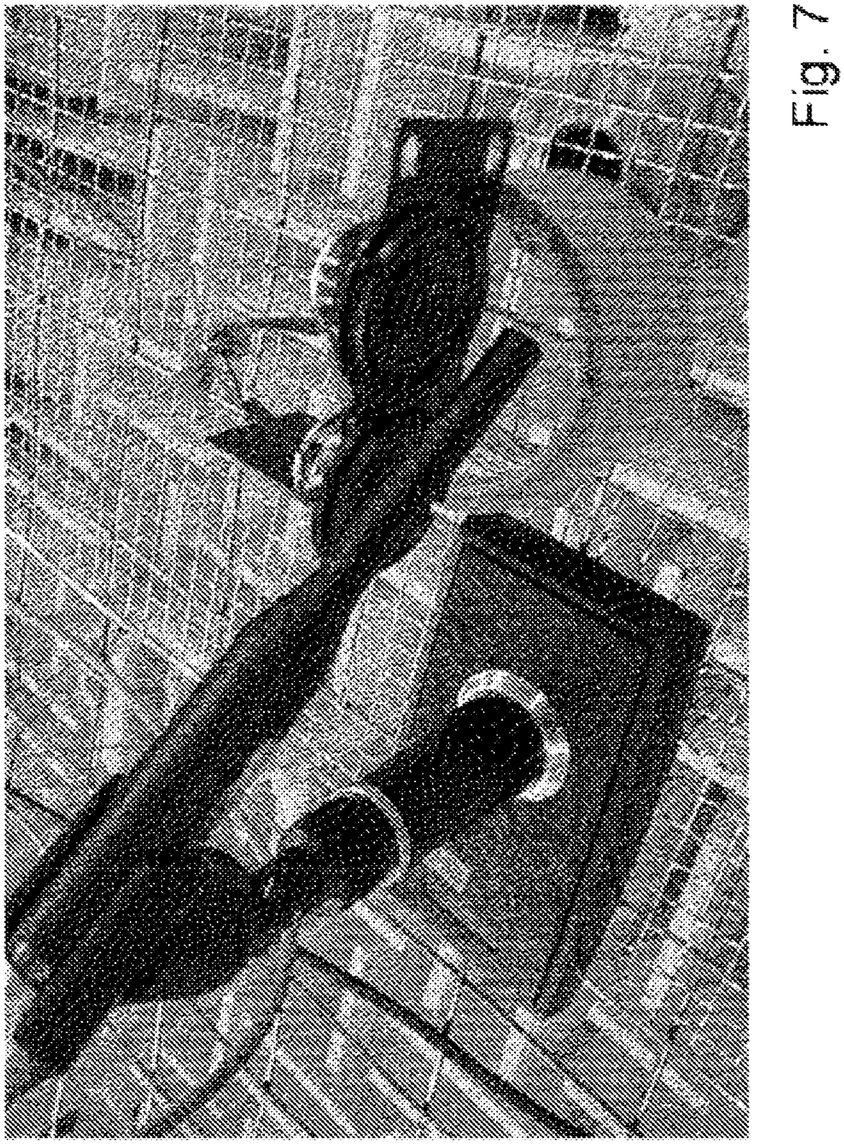
FIG. 7 is a diagram illustrating a state of an experiment (positional relationship between a speaker unit pair and a microphone).

Here, results of experiments for measuring frequency characteristics of a speaker, a speaker unit, and a speaker unit pair will be described. In the experiments, as a speaker, a speaker unit, and a speaker unit pair, a speaker having a diaphragm with a diameter of 4.5 cm (see FIG. 5), a speaker unit obtained by removing the speaker box from the speaker (see FIG. 6), and a speaker unit pair having the two speaker units arranged side by side (see FIG. 7) were used. In addition, in order to measure frequency characteristics in the vicinity of the speaker, the speaker unit, and the speaker unit pair, microphones were installed under four conditions described below.

Figure 8:
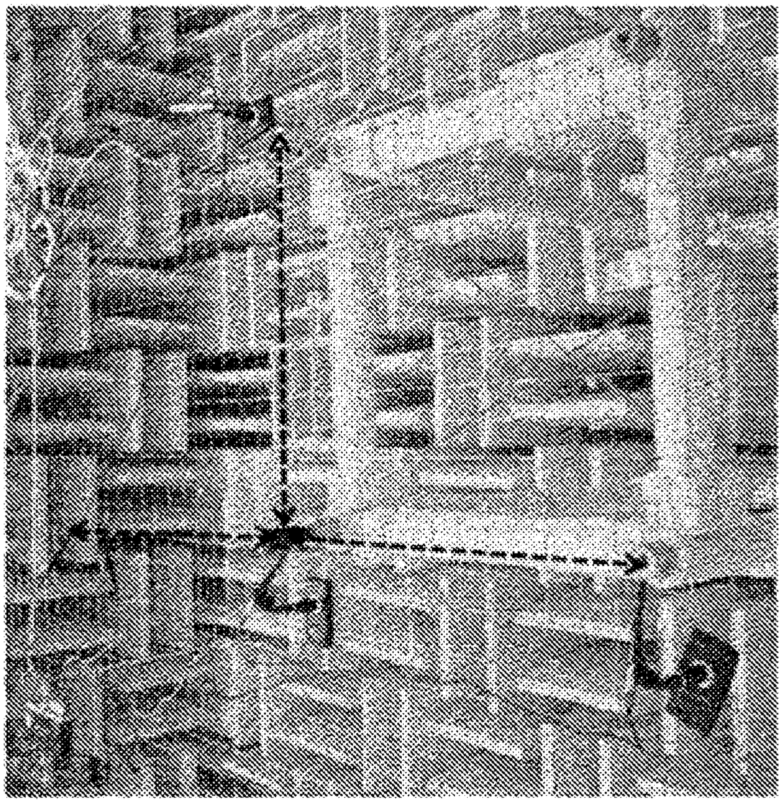
FIG. 8 is a diagram illustrating a state of an experiment (other measurement positions).
Figure 9:
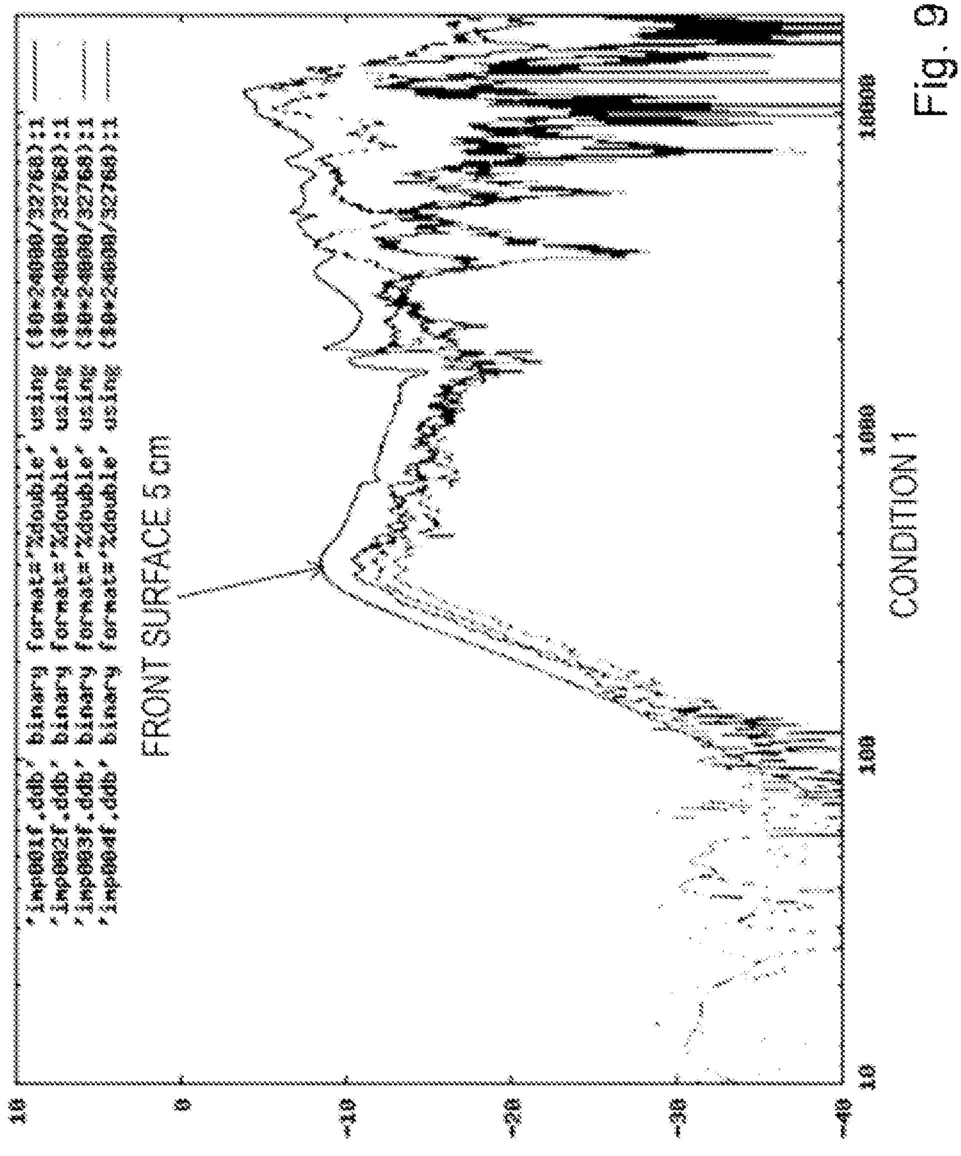
FIG. 9 is a diagram illustrating an experimental result (Condition 1).
Figure 10:
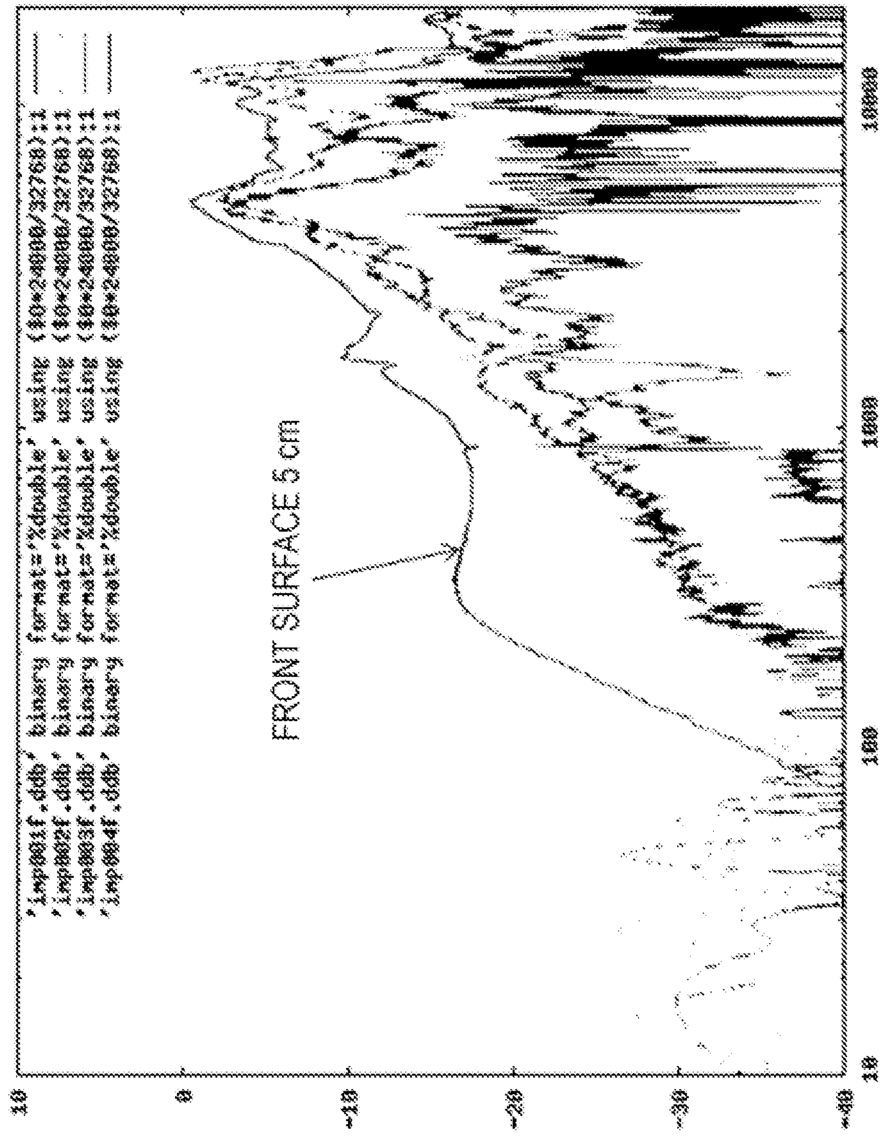
FIG. 10 is a diagram illustrating an experimental result (Condition 2).
Figure 11:
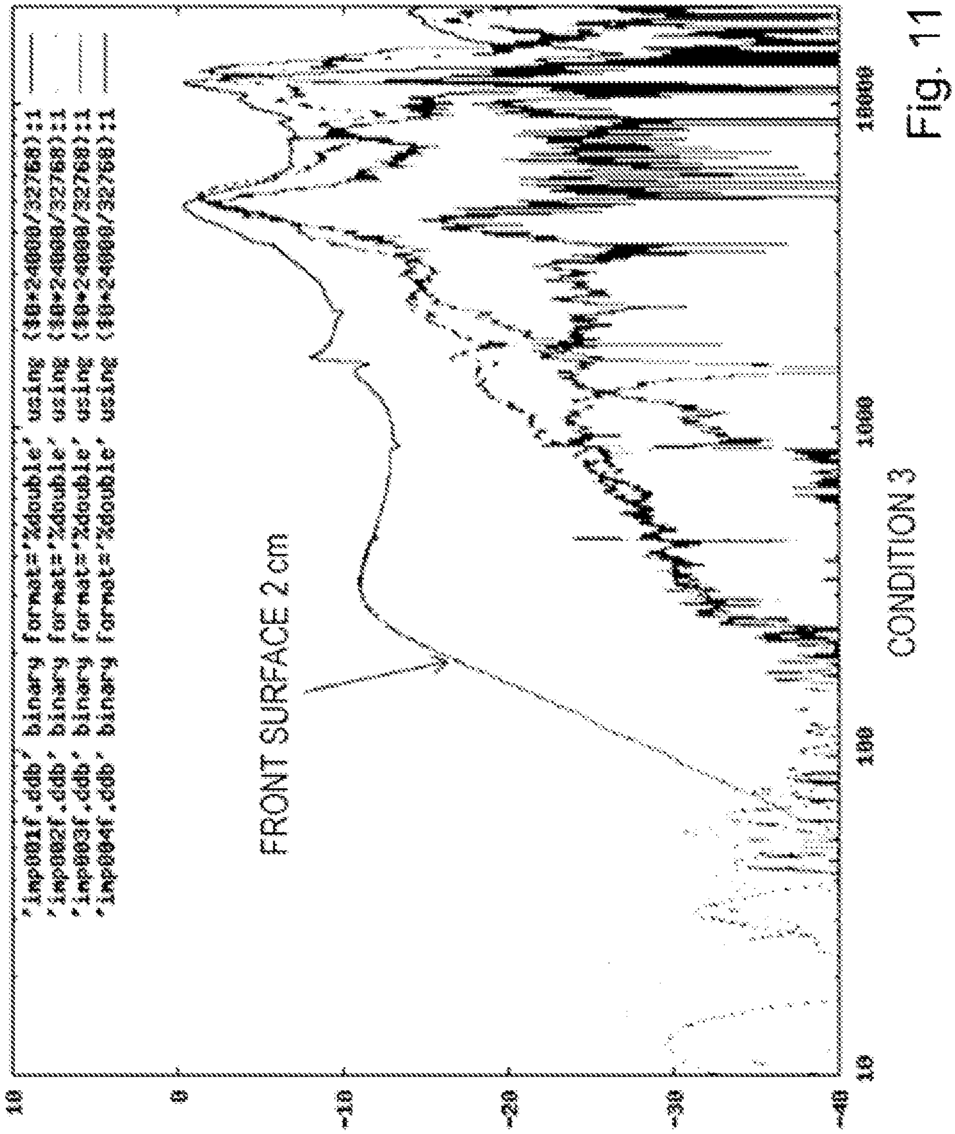
FIG. 11 is a diagram illustrating an experimental result (Condition 3).
Figure 12:
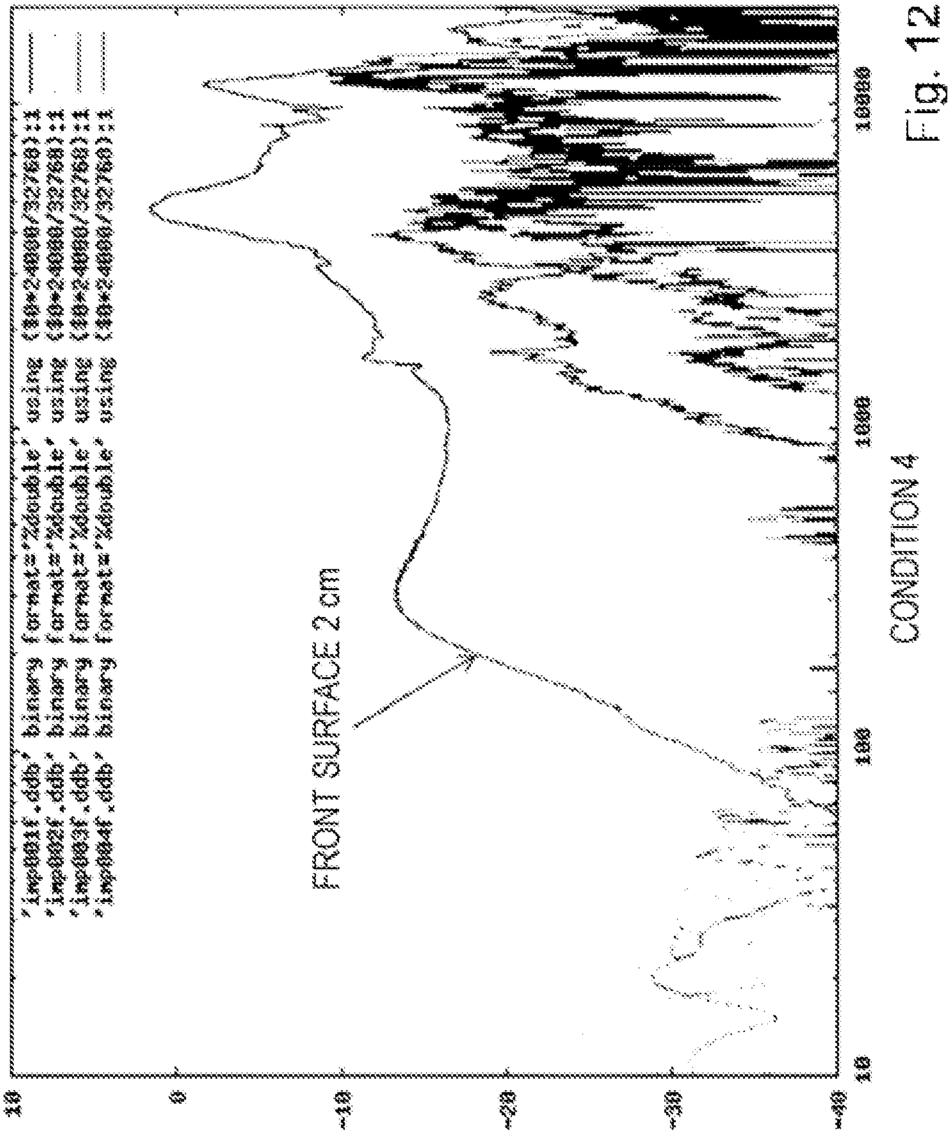
FIG. 12 is a diagram illustrating an experimental result (Condition 4).

(Condition 1) Position of 5 cm from the front surface of the speaker (Condition 2) Position of 5 cm from the front surface of the speaker unit (Condition 3) Position of 2 cm from the front surface of the speaker unit (Condition 4) Position of 2 cm from the front surface of the speaker unit pair In addition, for any of the conditions, microphones were also installed at positions of 100 cm from the front surface, back surface, and side surface of the speaker, the speaker unit, and the speaker unit pair for comparison (see FIG. 8).

Hereinafter, experimental results will be described. FIGS. 9, 10, 11, and 12 are diagrams illustrating experimental results, and are diagrams illustrating relationships between frequencies and attenuation under Conditions 1, 2, 3, and 4. In each drawing, four curves are illustrated, one curve indicated by an arrow is obtained by collecting a sound with the microphone at the position of 5 cm or 2 cm from the front surface, and the other three curves are obtained by collecting sounds with the microphones at the positions of 100 cm from the front surface, the back surface, and the side surface. Note that the position of 5 cm or 2 cm from the front surface is located in the vicinity of the speaker or the like and thus the curve at the position of 5 cm or 2 cm from the front surface has a very large gain. Therefore, the curve at the position of 5 cm from the front surface is plotted with its value reduced by 25 dB from the three curves at the positions of 100 cm for the sake of easy viewing. Similarly, the curve at the position of 2 cm from the front surface is plotted with its value reduced by 32 dB. Comparing FIG. 9 with FIG. 10, it can be seen that there is almost no difference among the four curves when the speaker is used, whereas there is a difference between the curve at the position of 5 cm from the front surface and the other three curves when the speaker unit is used. This difference is more remarkable in a lower frequency range. In addition, comparing FIG. 11 with FIG. 12, it can be seen that the speaker unit pair has a larger difference between the curve at the position of 2 cm from the front surface and the other three curves than the speaker unit.

As described above, it was confirmed from the experiments that the sound emitted from the speaker unit pair of the invention of the present application can be heard only in the vicinity of the speaker unit pair.

First Embodiment

A system that reproduces an acoustic signal obtained on the basis of a reproduction target is referred to as an acoustic system. The acoustic system includes a speaker system for emitting an acoustic signal as a sound (hereinafter, this sound is referred to as a sound based on the acoustic signal). Here, the speaker system is a device that converts an acoustic signal that is an analog signal into a sound. In addition, the reproduction target is, for example, data or a signal based on which it is possible to obtain an acoustic signal by predetermined processing, such as data recorded in a CD, a DVD, or a record, data received through the Internet, or a signal received through radio broadcasting or television broadcasting.

Figure 13:
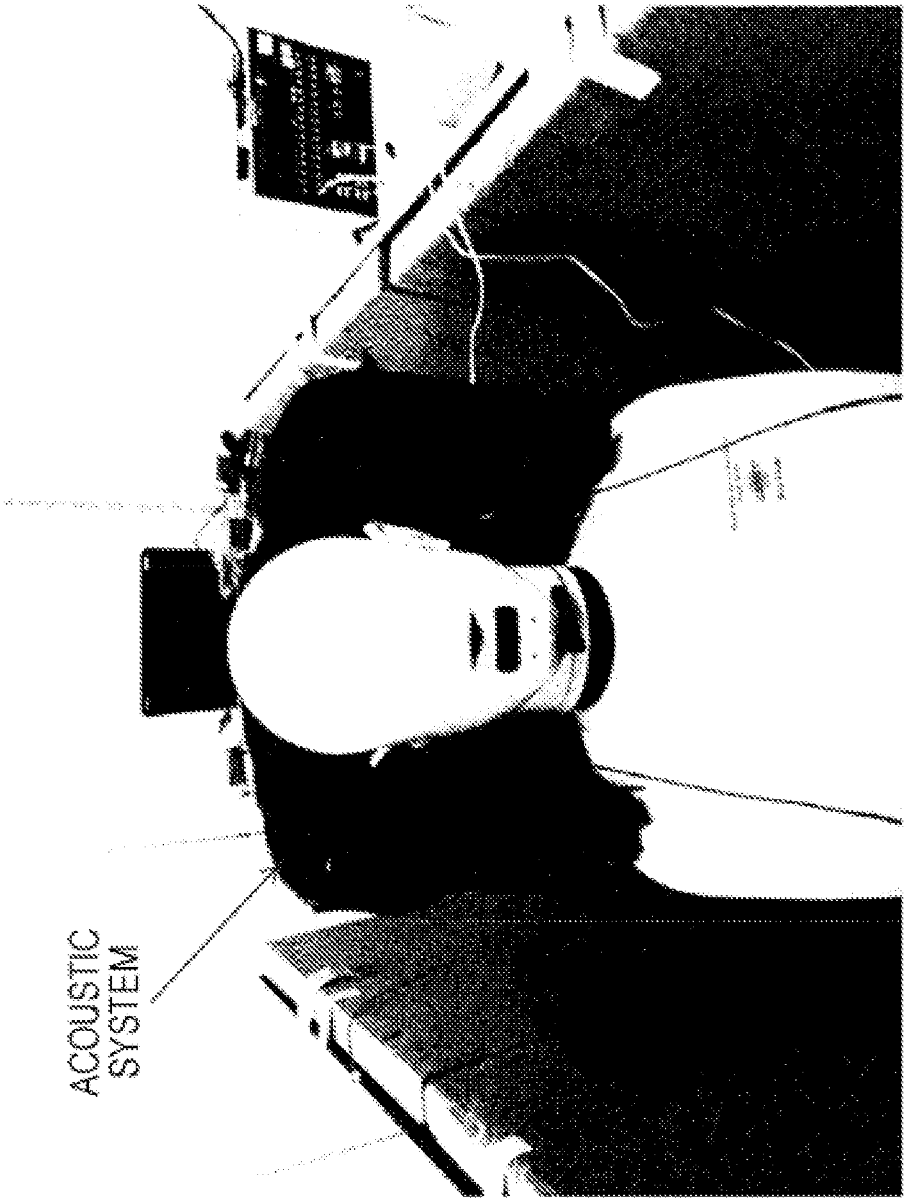
FIG. 13 is a diagram illustrating an example of an acoustic system installed in a seat of an aircraft.

Here, the acoustic system that reproduces an acoustic signal obtained from a reproduction target so that only a user in the vicinity of the speaker system can hear a sound based on the acoustic signal will be described. That is, the reproduced sound of the acoustic system cannot be heard by users other than the user in the vicinity of the speaker system. When such an acoustic system is used, for example, as an acoustic system for a user who uses a seat of an aircraft, it is possible to provide a system in which only the user who uses the seat can hear the reproduced sound. FIG. 13 is a diagram illustrating an example of an acoustic system installed in a seat of an aircraft. The acoustic system in FIG. 13 is installed at the seat so as to sandwich the head of the seated user, and two speaker unit pairs are arranged to be near the left and right ears. Note that such an acoustic system can also be installed in vehicles other than aircrafts such as automobiles and trains, a reclining chair, and the like, and can also be installed in a wearable form such as being placed on a shoulder. In addition, a driver unit pair in which two driver units corresponding to the above-described speaker unit pair are arranged may be installed in each of left and right units of headphones or earphones. The headphones are generally roughly classified into an open-type (open-air type) and a closed-back type (closed-type), and when the above technique is applied particularly to an open-type in which there is a concern of sound leakage, sound leakage is expected to be reduced.

Figure 14:
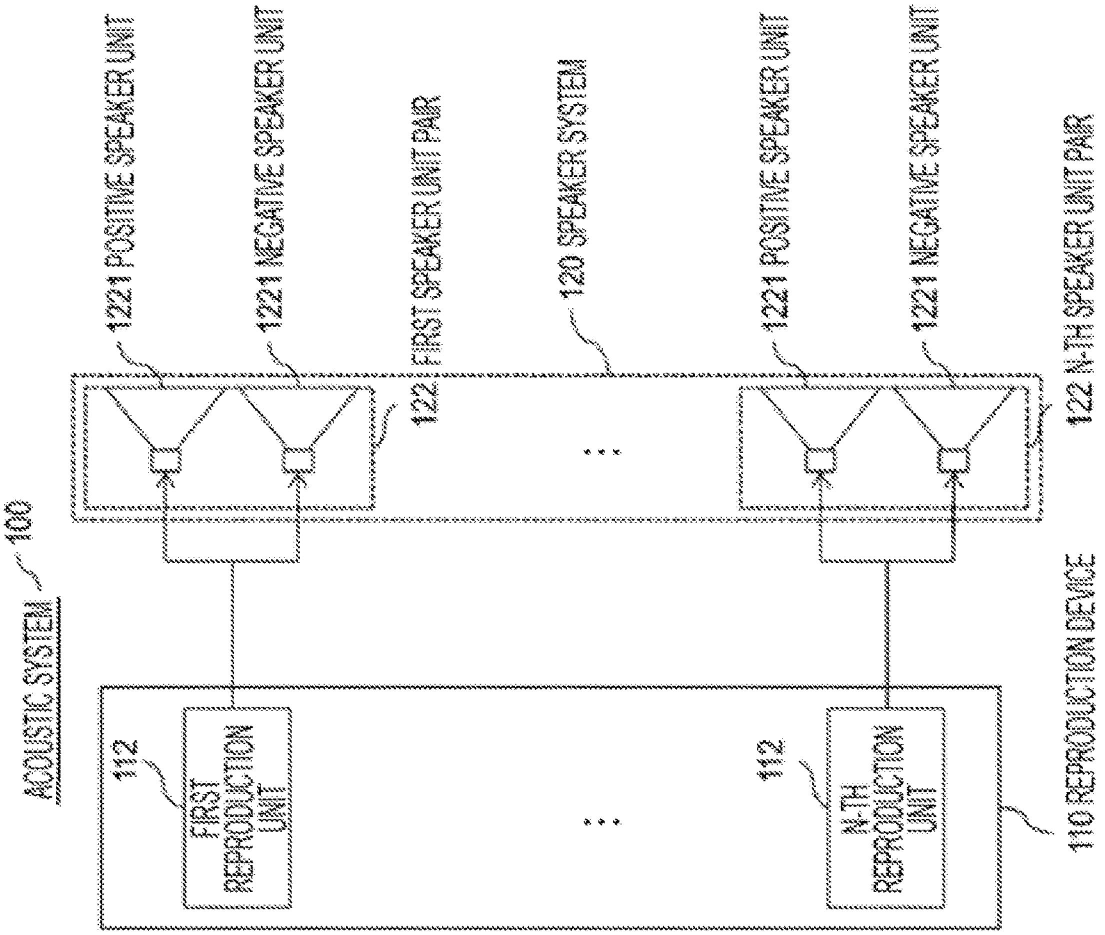
FIG. 14 is a block diagram illustrating an example of a configuration of an acoustic system 100.

Hereinafter, an acoustic system 100 will be described with reference to FIG. 14. FIG. 14 is a block diagram illustrating a configuration of the acoustic system 100. As illustrated in FIG. 14, the acoustic system 100 includes a reproduction device 110 and a speaker system 120. The reproduction device 110 includes N (where N is an integer of 1 or more) reproduction units 112 (that is, a first reproduction unit 112, . . . , and an N-th reproduction unit 112). In addition, the speaker system 120 also includes N speaker unit pairs 122 (that is, a first speaker unit pair 122, . . . , and an N-th speaker unit pair 122). Each speaker unit pair 122 includes two speaker units (that is, a positive speaker unit 1221 and a negative speaker unit 1221). An acoustic signal having a phase opposite to that of an acoustic signal input to the positive speaker unit 1221 is input to the negative speaker unit 1221. The speaker system 120 is installed at a position close to the head of the user who uses the seat.

Note that a direction in which the n-th speaker unit pair 122 faces the user is defined as an n-th user direction ($n=1, \ldots, N$), and the positive speaker unit 1221 and the negative speaker unit 1221 of the n-th speaker unit pair 122 ($n=1, \ldots, N$) are arranged so that a sound emitted from the positive speaker unit 1221 in a direction opposite to the n-th user direction and a sound emitted from the negative speaker unit 1221 in the direction opposite to the n-th user direction are transmitted in the n-th user direction by wraparound. Here, the n-th user direction is a front direction of the positive speaker unit 1221 and the negative speaker unit 1221 of the n-th speaker unit pair 122. In addition, the direction opposite to the n-th user direction is a rear direction of the positive speaker unit 1221 and the negative speaker unit 1221 of the n-th speaker unit pair 122.

In addition, the positive speaker unit 1221 and the negative speaker unit 1221 of the n-th speaker unit pair 122 (n=1, . . . , N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, an operation of the acoustic system 100 will be described with reference to FIG. 14.

The reproduction device 110 receives, as input, a first acoustic signal, a third acoustic signal, . . . , and a (2N−1)-th acoustic signal, which are acoustic signals obtained on the basis of the reproduction target, and outputs the first acoustic signal, a second acoustic signal, . . . , and a 2N-th acoustic signal. More specifically, an n-th reproduction unit 112 (n=1, . . . , N) receives, as input, a (2n−1)-th acoustic signal, generates a 2n-th acoustic signal that is an acoustic signal having a phase opposite to that of the (2n−1)-th acoustic signal from the (2n−1)-th acoustic signal, and outputs the (2n−1)-th acoustic signal and the 2n-th acoustic signal. The (2n−1)-th acoustic signal and the 2n-th acoustic signal are input to the positive speaker unit 1221 and the negative speaker unit 1221 of the n-th speaker unit pair 122, respectively.

The speaker system 120 receives, as input, the first acoustic signal, the second acoustic signal, . . . , and the 2N-th acoustic signal output from the reproduction device 110, and emits a sound based on the first acoustic signal, a sound based on the second acoustic signal, . . . , and a sound based on the 2N-th acoustic signal. More specifically, the n-th speaker unit pair 122 (n=1, . . . , N) receives, as input, the (2n−1)-th acoustic signal and the 2n-th acoustic signal, emits a sound based on the (2n−1)-th acoustic signal from the positive speaker unit 1221, and emits a sound based on the 2n-th acoustic signal from the negative speaker unit 1221. Since the (2n−1)-th acoustic signal and the 2n-th acoustic signal are in opposite phase relationship with each other, the sound is heard only in the vicinity of the seat where the speaker system 120 is installed as described in <Technical Background>. For example, in the case of N=2, when the first acoustic signal and the third acoustic signal are respectively a right-channel acoustic signal and a left-channel acoustic signal of a certain sound source, a stereo sound can be heard only in the vicinity of the seat where the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the direction opposite to the n-th user direction have a mutually opposite phase relationship. Similarly, a sound emitted from the negative speaker unit 1221 of the n-th speaker unit pair 122 in the n-th user direction and a sound emitted from the negative speaker unit 1221 of the n-th speaker unit pair 122 in the direction opposite to the n-th user direction are in mutually opposite phase relationship.

According to the embodiment of the present invention, it is possible to reproduce a sound that can be heard only in a very limited narrow range such as the vicinity of the speaker system.

(Configuration Example of Speaker Unit Pair)

The positive speaker unit and the negative speaker unit included in one speaker unit pair are basically in a very close positional relationship. In addition, the same speaker unit is used for the positive speaker unit and the negative speaker unit so that acoustic characteristics are the same. Note that, instead of using the same speaker unit, an acoustic signal subjected to signal processing may be input so that acoustic characteristics of the positive speaker unit and the negative speaker unit are the same.

Here, a configuration example of the speaker unit pair will be described from the viewpoint of the positional relationship between the positive speaker unit and the negative speaker unit.

Note that, in any of the configuration examples described below, the speaker unit pair is configured such that the sound emitted from the positive speaker unit in the direction opposite to the user direction (that is, in the rear direction) and the sound emitted from the negative speaker unit in the direction opposite to the user direction (that is, in the rear direction) go around in the user direction (that is, the front direction).

Figure 15:
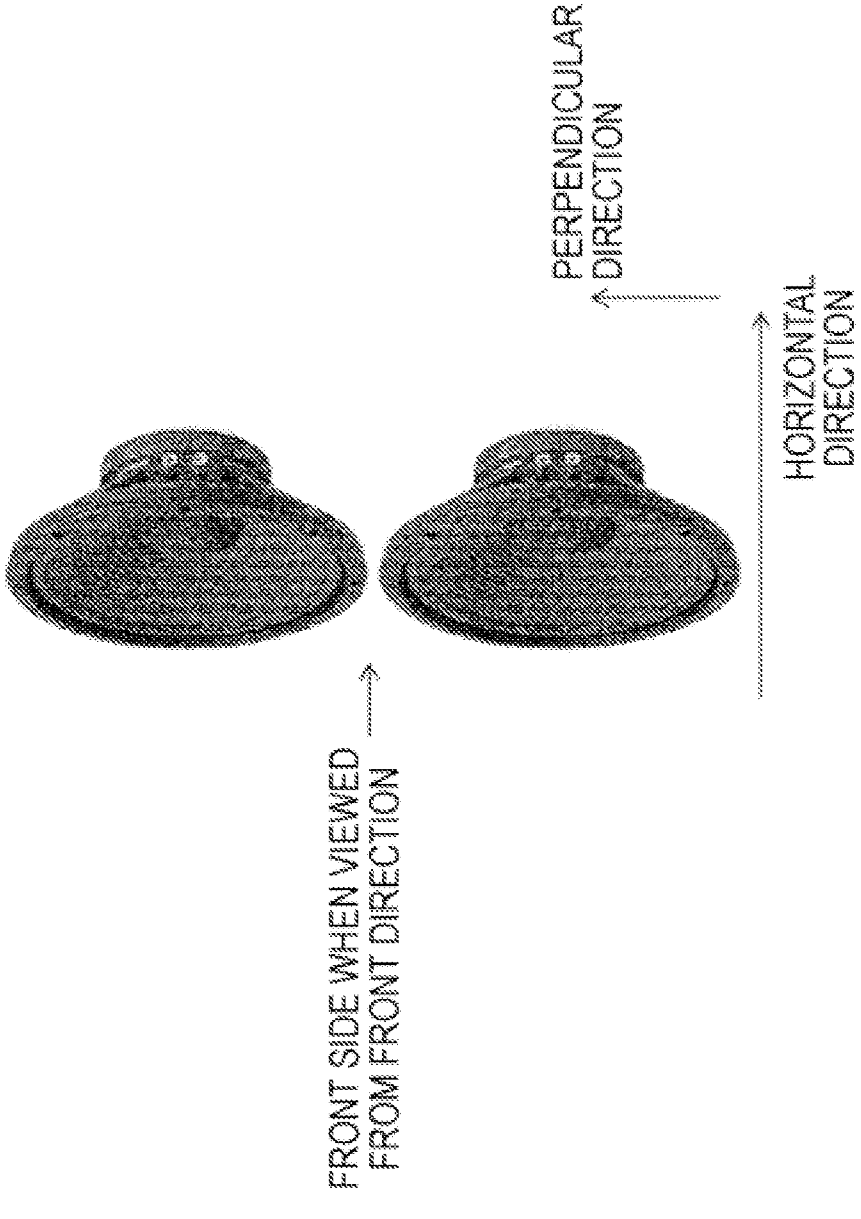
FIG. 15 is a diagram illustrating an example of a configuration of a speaker unit pair.

Configuration Example 1: FIG. 15 is a diagram illustrating an example of a configuration of a speaker unit pair in which a positive speaker unit and a negative speaker unit are arranged so as to be aligned vertically. More specifically, the speaker unit pair is configured such that a surface of the positive speaker unit and a surface of the negative speaker unit of the speaker unit pair located foremost when viewed from the front direction of the speaker unit pair are one plane perpendicular to the ground plane of the speaker unit pair, and the arrangement of the positive speaker unit and the negative speaker unit of the speaker unit pair when viewed from the front direction of the speaker unit pair is parallel to the direction perpendicular to the ground plane of the speaker unit pair. Here, in the example of FIG. 15, a surface of the positive speaker unit and a surface of the negative speaker unit of the speaker unit pair located foremost when viewed from the front direction of the speaker unit pair are a surface with which portions (that is, the bottom surfaces of the two cones) of cone-shaped diaphragms constituting the positive speaker unit and the negative speaker unit that are located foremost when viewed from the front surface are in contact. As can be seen from FIG. 15, the positive speaker unit and the negative speaker unit are usually arranged in a very close positional relationship, such as adjacent to each other.

Figure 16:
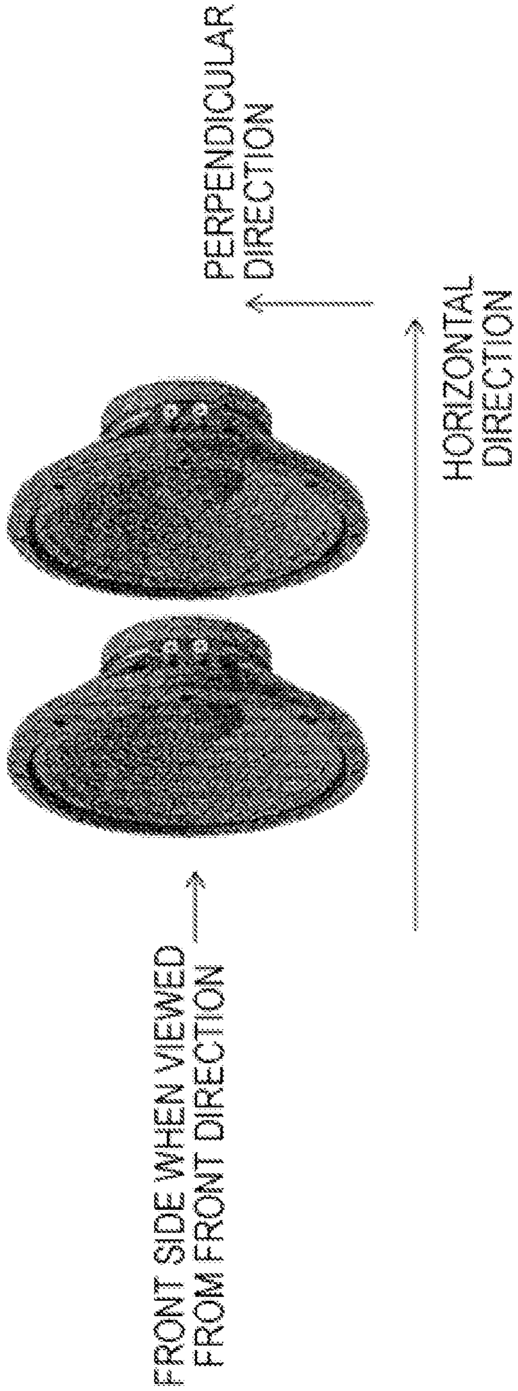
FIG. 16 is a diagram illustrating an example of a configuration of a speaker unit pair.

Configuration Example 2: FIG. 16 is a diagram illustrating an example of a configuration of a speaker unit pair in which a positive speaker unit and a negative speaker unit are arranged so as to be arranged side by side. More specifically, the speaker unit pair is configured such that a surface of the positive speaker unit and a surface of the negative speaker unit of the speaker unit pair located foremost when viewed from the front direction of the speaker unit pair are one plane perpendicular to the ground plane of the speaker unit pair, and the arrangement of the positive speaker unit and the negative speaker unit of the speaker unit pair when viewed from the front direction of the speaker unit pair is parallel to a direction horizontal to the ground plane of the speaker unit pair. As can be seen from FIG. 16, the positive speaker unit and the negative speaker unit are usually arranged in a very close positional relationship, such as adjacent to each other.

Figure 17:
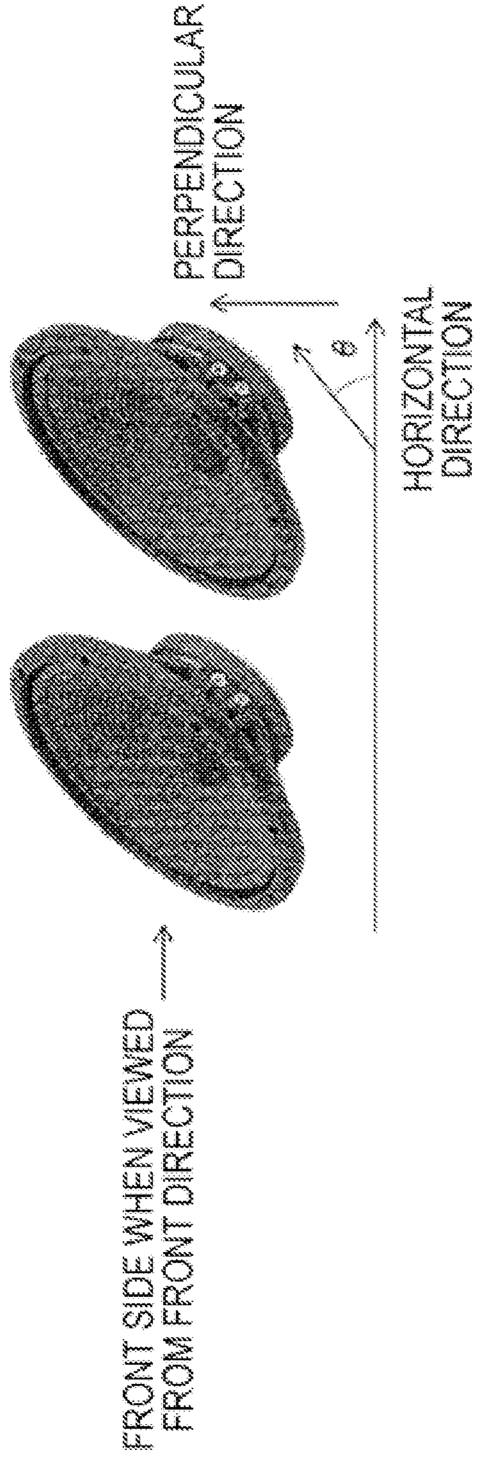
FIG. 17 is a diagram illustrating an example of a configuration of a speaker unit pair.

Configuration Example 3: FIG. 17 is a diagram illustrating an example of a configuration of a speaker unit pair in which a positive speaker unit and a negative speaker unit are inclined obliquely and arranged side by side. More specifically, the speaker unit pair is configured such that a surface of the positive speaker unit and a surface of the negative speaker unit of the speaker unit pair located foremost when viewed from the front direction of the speaker unit pair are a plane forming a predetermined angle θ (where $0<\theta<\pi/2$)

with the ground plane of the speaker unit pair, and the arrangement of the positive speaker unit and the negative speaker unit of the speaker unit pair when viewed from the front direction of the speaker unit pair is parallel to a direction horizontal to the ground plane of the speaker unit pair. As can be seen from FIG. 17, the positive speaker unit and the negative speaker unit are usually arranged in a very close positional relationship, such as adjacent to each other.

Figure 18A:
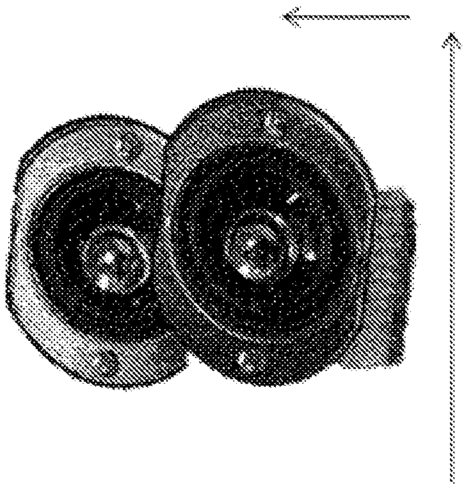
FIG. 18A is a diagram illustrating an example of a configuration of a speaker unit pair.
Figure 18B:
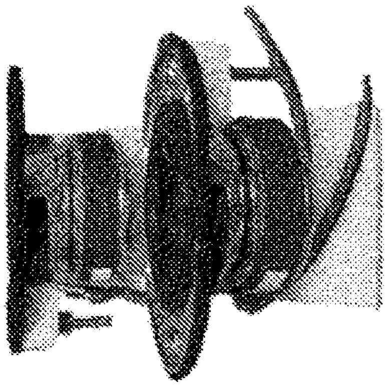
FIG. 18B is a diagram illustrating an example of a configuration of a speaker unit pair.
Figure 18C:
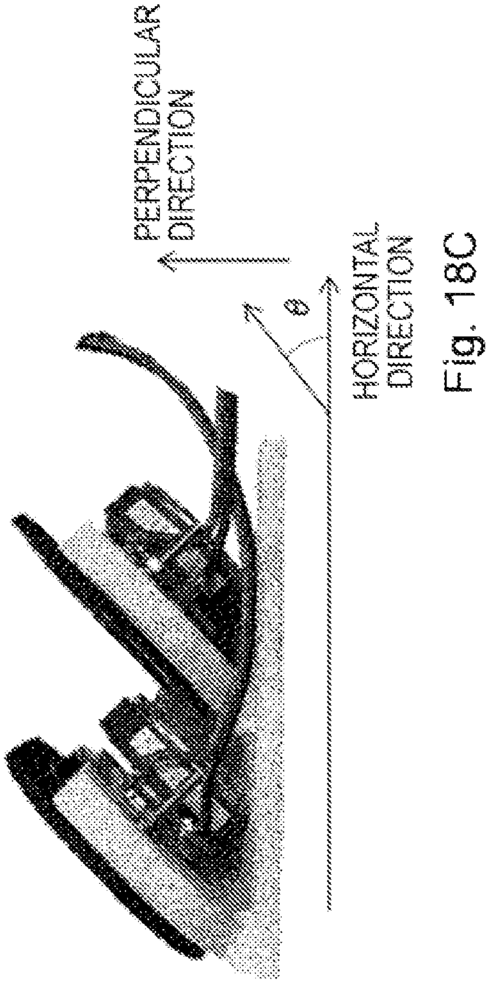
FIG. 18C is a diagram illustrating an example of a configuration of a speaker unit pair.

Configuration Example 4: FIGS. 18A, 18B, and 18C are diagrams illustrating an example of a configuration of a speaker unit pair in which a positive speaker unit and a negative speaker unit are inclined obliquely and arranged in one row at front and rear sides. FIG. 18A is a front view of the positive speaker unit and the negative speaker unit, FIG. 18B is a rear view of the positive speaker unit and the negative speaker unit, and FIG. 18C is a side view of the positive speaker unit and the negative speaker unit. More specifically, the speaker unit pair is configured such that each of a surface of a positive speaker unit of the speaker unit pair located foremost when viewed from the front direction of the speaker unit pair and a surface of a negative speaker unit of the speaker unit pair located foremost when viewed from the front direction of the speaker unit pair is parallel to one plane forming a predetermined angle $\theta$ (where $0<\theta<\pi/2$) with the ground plane of the speaker unit pair. Here, in the example of FIG. 18A, the surface of the positive speaker unit (negative speaker unit) of the speaker unit pair located foremost when viewed from the front surface of the speaker unit pair is a surface with which a portion (that is, the bottom surface of one cone) of the cone-shaped diaphragm constituting the positive speaker unit (negative speaker unit) that is located foremost when viewed from the front surface is in contact. As can be seen from FIGS. 18A, 18B, and 18C, the positive speaker unit and the negative speaker unit are usually arranged in a very close positional relationship, such as adjacent to each other. In addition, as can be seen from FIG. 18C, when the positive speaker unit and the negative speaker unit are viewed from directly above, the positive speaker unit and the negative speaker unit appear to overlap each other. In a case where the positional relationship between the positive speaker unit and the negative speaker unit is very close in such a degree as illustrated in FIG. 18C, the volume occupied by the speaker units can be reduced, so that the acoustic system can be downsized.

In a case where the positive speaker unit and the negative speaker unit are arranged in an obliquely inclined manner as in Configuration Example 3 and Configuration Example 4, an area to be made audible may deviate from a desired area due to the arrangement in an obliquely inclined manner. In such a case, the directivity control of the acoustic signal may be performed so that the position where the user's ear comes is included in the area to be made audible. An arbitrary method can be used for the directivity control, and for example, filtering using a finite impulse response (FIR) filter can be used. At this time, the FIR filter may be designed with a speaker unit close to an area to be made audible as a reference.

<Supplement>

The above-described description of the embodiments of the present invention has been presented for purposes of illustration and description. There is no intention to be exhaustive or to limit the invention to the precise form disclosed. Modifications and variations are possible from the above teaching. The embodiments have been chosen and represented in order to provide the best illustration of the principles of the present invention and to enable those skilled in the art to utilize the present invention in various embodiments and by adding various modifications to be suited for contemplated practical use. All such modifications and variations are within the scope of the present invention as defined by the appended claims, interpreted in accordance with a fairly and legally equitable breadth.

The invention claimed is:

1. An acoustic system comprising a speaker system that includes a speaker unit pair including a positive speaker unit that emits a sound based on a first acoustic signal of a predetermined sound source and a negative speaker unit that emits a sound based on a second acoustic signal having an opposite phase to the first acoustic signal, wherein the speaker unit pair is configured such that a diaphragm of the positive speaker unit and a diaphragm of the negative speaker unit of the speaker unit pair when viewed from a front direction of the speaker unit pair are one plane perpendicular to a ground plane of the speaker unit pair, and an arrangement of the diaphragm of the positive speaker unit and the diaphragm of the negative speaker unit of the speaker unit pair when viewed from the front direction of the speaker unit pair is parallel to a direction perpendicular to the ground plane of the speaker unit pair, the positive speaker unit emits a first positive sound based on the first acoustic signal in the front direction, the positive speaker unit emits a first negative sound based on the first acoustic signal in the rear direction, the negative speaker unit emits a second negative sound based on the second acoustic signal in the front direction, the negative speaker unit emits a second positive sound based on the second acoustic signal in the rear direction, the first positive sound and the second negative sound emitted by the speaker unit pair form a single audible area in front of the speaker unit pair for hearing by one ear of a pair of ears, and the single audible area represents an area where there is mismatch of phases among the first positive sound and the first negative sound respectively emitted from the speaker unit pair in the front direction and the first negative sound and the second positive sound emitted in the rear direction and having gone around in the front direction and into the single audible area.

2. The acoustic system according to claim 1, wherein the positive speaker unit and the negative speaker unit of the speaker unit pair are arranged in a positional relationship in which a sound emitted from the positive speaker unit and a sound emitted from the negative speaker unit are mutually erased so that the sounds are inaudible by users other than those in the vicinity of the speaker system.

3. The acoustic system according to claim 1, wherein the speaker system further comprises another speaker unit pair, said another speaker unit pair comprises another positive speaker unit and another negative speaker unit, another audible area is formed for said another speaker unit pair, the single audible area formed for the speaker unit pair corresponds to a channel of stereo sound for an ear of the pair of ears of a user, and said another audible area corresponds to another channel of the stereo sound for another ear of the pair of ears of the user.

4. An acoustic system comprising a speaker system that includes a speaker unit pair including a positive speaker unit that emits a sound based on a first acoustic signal of a predetermined sound source and a negative speaker unit that emits a sound based on a second acoustic signal having an opposite phase to the first acoustic signal, wherein the speaker unit pair is configured such that a diaphragm of the positive speaker unit and a diaphragm of the negative speaker unit of the speaker unit pair when viewed from a front direction of the speaker unit pair are one plane perpendicular to a ground plane of the speaker unit pair, and an arrangement of the diaphragm of the positive speaker unit and the diaphragm of the negative speaker unit of the speaker unit pair when viewed from the front direction of the speaker unit pair is parallel to a direction horizontal to the ground plane of the speaker unit pair, the positive speaker unit emits a first positive sound based on the first acoustic signal in the front direction, the positive speaker unit emits a first negative sound based on the first acoustic signal in the rear direction, the negative speaker unit emits a second negative sound based on the second acoustic signal in the front direction, the negative speaker unit emits a second positive sound based on the second acoustic signal in the rear direction, the first positive sound and the second negative sound emitted by the speaker unit pair form a single audible area in front of the speaker unit pair for hearing by one ear of a pair of ears, and the single audible area represents an area where there is mismatch of phases among the first positive sound and the first negative sound respectively emitted from the speaker unit pair in the front direction and the first negative sound and the second positive sound emitted in the rear direction and having gone around in the front direction and into the single audible area.

5. The acoustic system according to claim 4, wherein the positive speaker unit and the negative speaker unit of the speaker unit pair are arranged in a positional relationship in which a sound emitted from the positive speaker unit and a sound emitted from the negative speaker unit are mutually erased so that the sounds are inaudible by users other than those in the vicinity of the speaker system.

6. The acoustic system according to claim 4, wherein the speaker system further comprises another speaker unit pair, said another speaker unit pair comprises another positive speaker unit and another negative speaker unit, another audible area is formed for said another speaker unit pair, the single audible area formed for the speaker unit pair corresponds to a channel of stereo sound for an ear of the pair of ears of a user, and said another audible area corresponds to another channel of the stereo sound for another ear of the pair of ears of the user.

7. An acoustic system comprising a speaker system that includes a speaker unit pair including a positive speaker unit that emits a sound based on a first acoustic signal of a predetermined sound source and a negative speaker unit that emits a sound based on second acoustic signal having an opposite phase to the first acoustic signal, wherein the speaker unit pair is configured such that a diaphragm of the positive speaker unit and a diaphragm of the negative speaker unit of the speaker unit pair when viewed from a front direction of the speaker unit pair are a plane forming a predetermined angle θ (where $0<\theta<\pi/2$) with a ground plane of the speaker unit pair, and an arrangement of the diaphragm of the positive speaker unit and the diaphragm of the negative speaker unit of the speaker unit pair when viewed from the front direction of the speaker unit pair is parallel to a direction horizontal to the ground plane of the speaker unit pair, the positive speaker unit emits a first positive sound based on the first acoustic signal in the front direction, the positive speaker unit emits a first negative sound based on the first acoustic signal in the rear direction, the negative speaker unit emits a second negative sound based on the second acoustic signal in the front direction, the negative speaker unit emits a second positive sound based on the second acoustic signal in the rear direction, the first positive sound and the second negative sound emitted by the speaker unit pair form a single audible area in front of the speaker unit pair for hearing by one ear of a pair of ears, and the single audible area represents an area where there is mismatch of phases among the first positive sound and the first negative sound respectively emitted from the speaker unit pair in the front direction and the first negative sound and the second positive sound emitted in the rear direction and having gone around in the front direction and into the single audible area.

8. The acoustic system according to claim 7, wherein the positive speaker unit and the negative speaker unit of the speaker unit pair are arranged in a positional relationship in which a sound emitted from the positive speaker unit and a sound emitted from the negative speaker unit are mutually erased so that the sounds are inaudible by users other than those in the vicinity of the speaker system.

9. The acoustic system according to claim 7, wherein the speaker system further comprises another speaker unit pair, said another speaker unit pair comprises another positive speaker unit and another negative speaker unit, another audible area is formed for said another speaker unit pair, the single audible area formed for the speaker unit pair corresponds to a channel of stereo sound for an ear of the pair of ears of a user, and said another audible area corresponds to another channel of the stereo sound for another ear of the pair of ears of the user.

10. An acoustic system comprising a speaker system that includes a speaker unit pair including a positive speaker unit that emits a sound based on a first acoustic signal of a predetermined sound source and a negative speaker unit that emits a sound based on a second acoustic signal having an opposite phase to the first acoustic signal, wherein the speaker unit pair is configured such that each of a diaphragm of the positive speaker unit of the speaker unit pair when viewed from a front direction of the speaker unit pair and a diaphragm of the negative speaker unit of the speaker unit pair when viewed from the front direction of the speaker unit pair is parallel to one plane forming a predetermined angle θ (where $0<\theta<\pi/2$) with a ground plane of the speaker unit pair, the positive speaker unit emits a first positive sound based on the first acoustic signal in the front direction, the positive speaker unit emits a first negative sound based on the first acoustic signal in the rear direction, the negative speaker unit emits a second negative sound based on the second acoustic signal in the front direction, the negative speaker unit emits a second positive sound based on the second acoustic signal in the rear direction, the first positive sound and the second negative sound emitted by the speaker unit pair form a single audible area in front of the speaker unit pair for hearing by one ear of a pair of ears, and the single audible area represents an area where there is mismatch of phases among the first positive sound and the first negative sound respectively emitted from the speaker unit pair in the front direction and the first negative sound and the second positive sound emitted in the rear direction and having gone around in the front direction and into the single audible area.

11. The acoustic system according to claim 10, wherein when the positive speaker unit and the negative speaker unit of the speaker unit pair are viewed from directly above, the positive speaker unit and the negative speaker unit of the speaker unit pair are in a positional relationship in which the positive speaker unit and the negative speaker unit of the speaker unit pair appear to overlap each other.

12. The acoustic system according to claim 10, wherein the positive speaker unit and the negative speaker unit of the speaker unit pair are arranged in a positional relationship in which a sound emitted from the positive speaker unit and a sound emitted from the negative speaker unit are mutually erased so that the sounds are inaudible by users other than those in the vicinity of the speaker system.

13. The acoustic system according to claim 10, wherein the speaker system further comprises another speaker unit pair, said another speaker unit pair comprises another positive speaker unit and another negative speaker unit, another audible area is formed for said another speaker unit pair, the single audible area formed for the speaker unit pair corresponds to a channel of stereo sound for an ear of the pair of ears of a user, and said another audible area corresponds to another channel of the stereo sound for another ear of the pair of ears of the user.

* * * * *